United States Patent
Codina

[11] Patent Number: 6,095,459
[45] Date of Patent: Aug. 1, 2000

[54] METHOD AND APPARATUS FOR COUNTERING ASYMMETRICAL AERODYNAMIC PROCESS SUBJECTED ONTO MULTI ENGINE AIRCRAFT

[76] Inventor: George Codina, 12841 Hawthorne Blvd., Hawthorne, Calif. 90250-4455

[21] Appl. No.: 09/204,682

[22] Filed: Dec. 3, 1998

Related U.S. Application Data

[63] Continuation-in-part of application No. 08/876,221, Jun. 16, 1997, abandoned.

[51] Int. Cl.[7] .................................................. B64C 9/32
[52] U.S. Cl. ..................... 244/213; 244/75 R; 244/90 R; 244/90 A
[58] Field of Search ................................... 244/213, 214, 244/215, 90 R, 90 A, 75 R

[56] References Cited

U.S. PATENT DOCUMENTS

| | | | |
|---|---|---|---|
| 1,565,763 | 12/1925 | Vickers | 244/177 |
| 1,804,006 | 5/1931 | Gay | 244/177 |
| 2,120,760 | 6/1938 | Lumiere | 244/213 |
| 2,635,837 | 4/1953 | Grant | 244/213 |
| 2,954,944 | 10/1960 | Huet | 244/76 R |
| 3,160,367 | 12/1964 | Lecarme | 244/76 R |
| 3,160,368 | 12/1964 | Young et al. | 244/76 J |
| 3,232,563 | 2/1966 | Langfelder | 244/213 |
| 3,471,107 | 10/1969 | Ornberg | 244/213 |
| 4,143,839 | 3/1979 | Antonov et al. | 244/90 A |
| 4,466,586 | 8/1984 | Burnham | 244/90 A |
| 4,739,957 | 4/1988 | Vess et al. | 244/213 |
| 5,456,425 | 10/1995 | Morris et al. | 244/3.22 |

FOREIGN PATENT DOCUMENTS

| | | | |
|---|---|---|---|
| 418120 | 12/1910 | France | 244/80 |
| 4-66394 | 3/1999 | Japan | 244/90 A |

*Primary Examiner*—Galen L. Barefoot
*Attorney, Agent, or Firm*—Frank L. Hart

[57] ABSTRACT

A method and apparatus is provided for countering asymmetrical aerodynamic forces subjected onto an aircraft. Asymmetrical forces are counteracted by this invention automatically by selectively actuating force inducing elements in response detection of one of (a) differential longitudinal forces induced upon the aircraft by the engines and (b) undesirable rotation of the aircraft about longitudinal axis "c" of the aircraft. The force inducing elements of this invention function independent of primary control elements and other control surfaces of the aircraft.

16 Claims, 5 Drawing Sheets

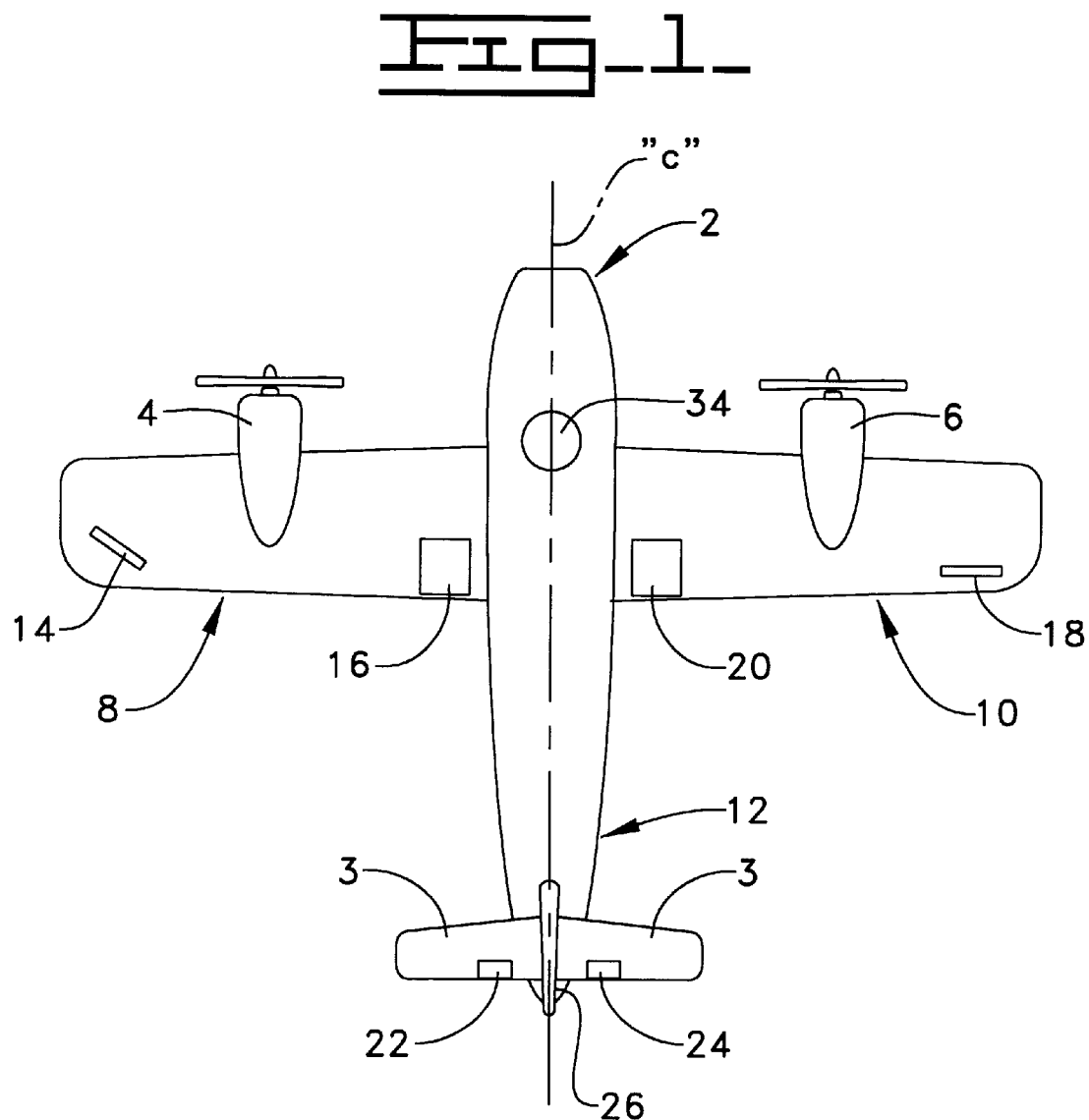

Fig-2-
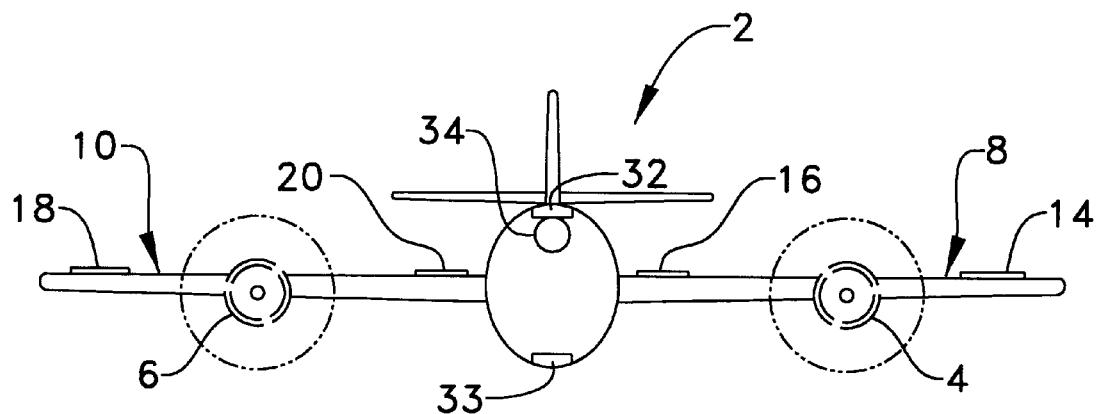
Fig-3-
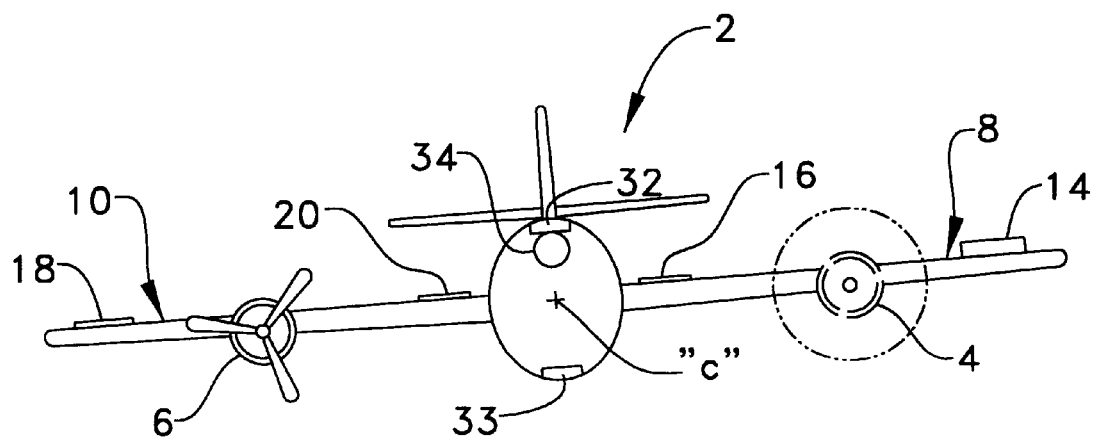

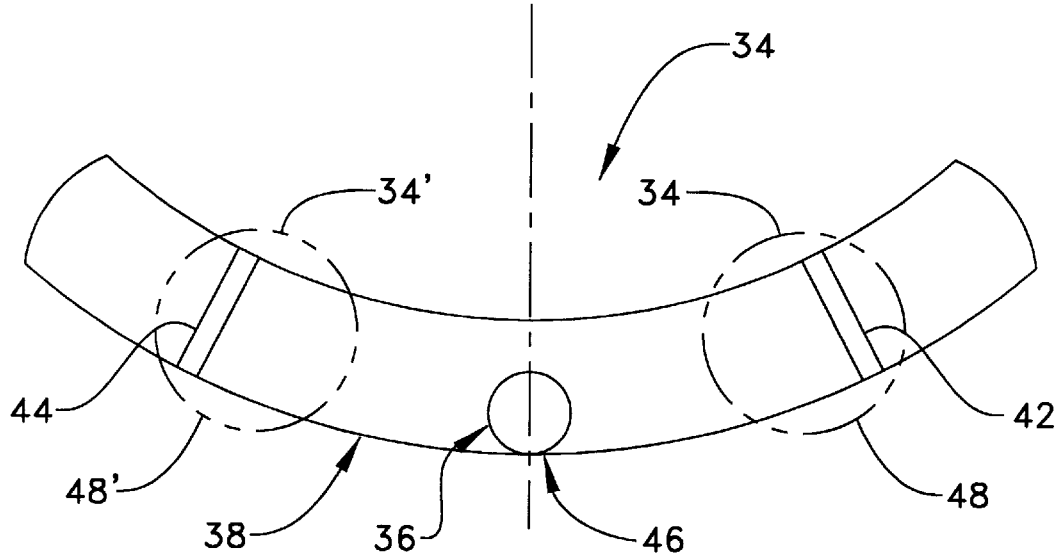
Fig-4a-
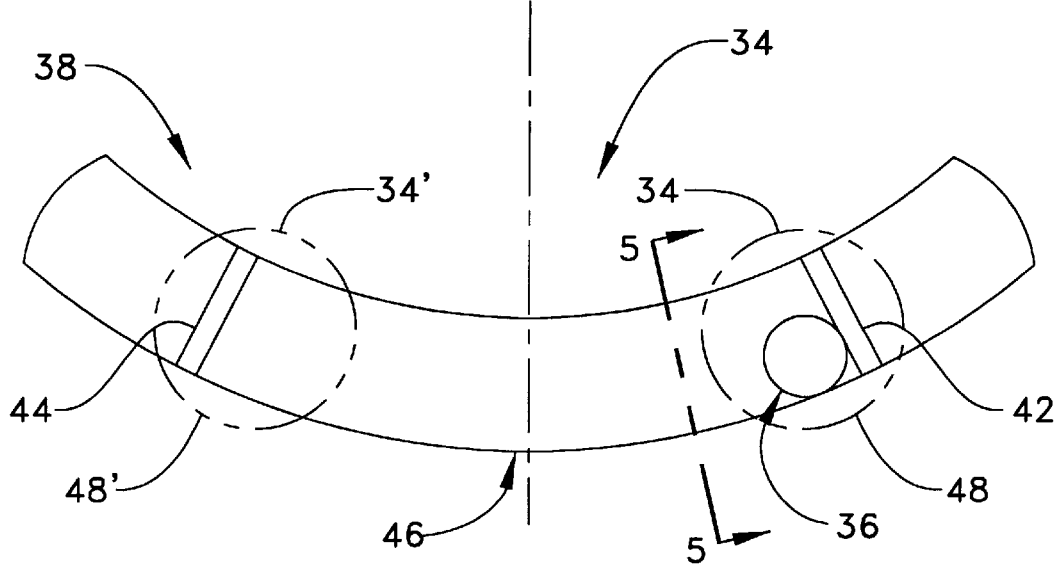
Fig-4b-

Fig_5_
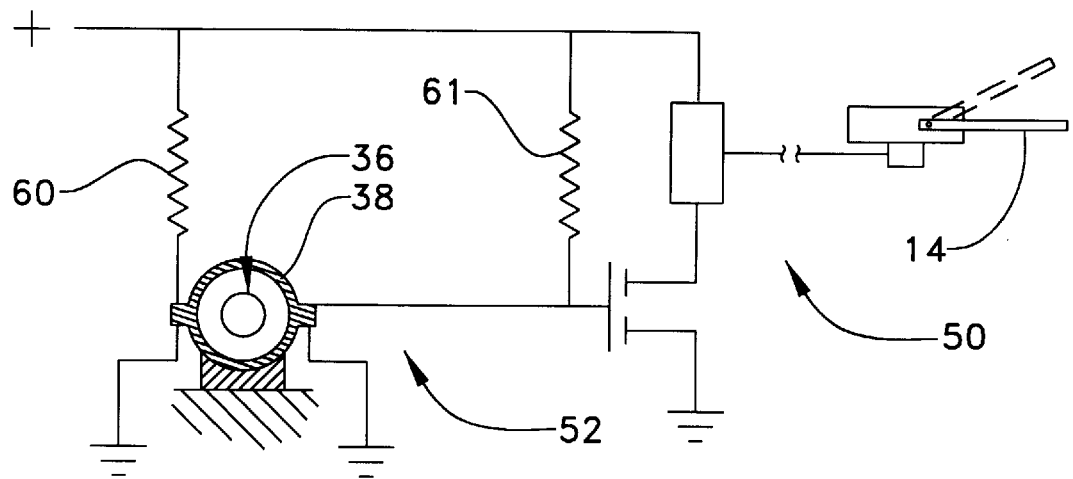
Fig_6_
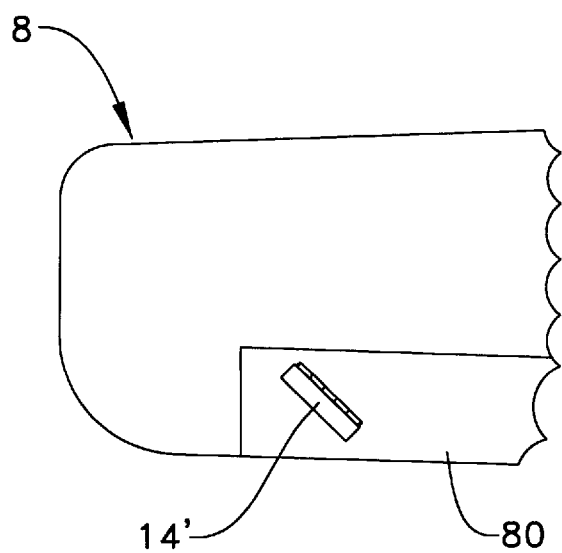

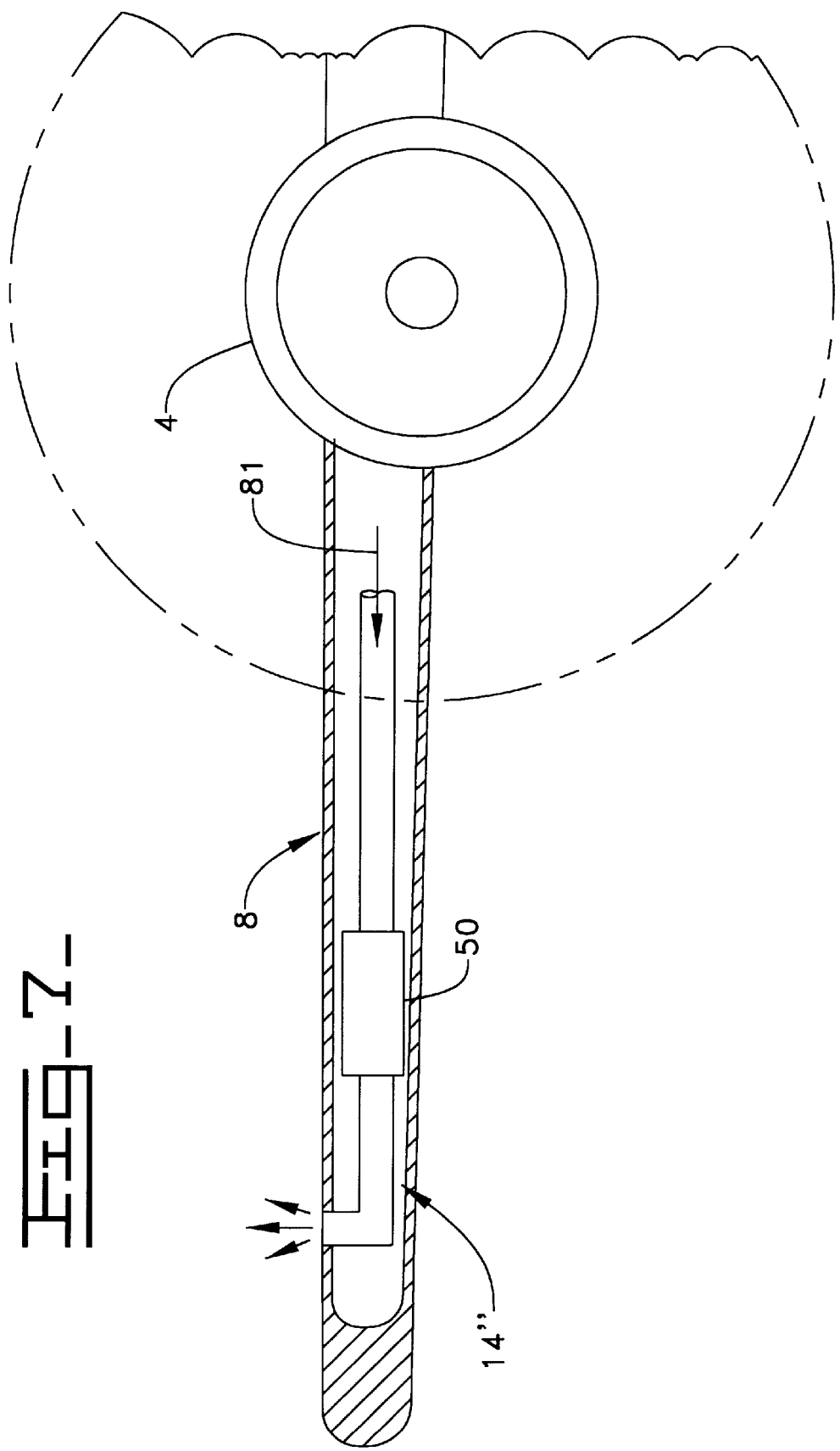

METHOD AND APPARATUS FOR COUNTERING ASYMMETRICAL AERODYNAMIC PROCESS SUBJECTED ONTO MULTI ENGINE AIRCRAFT

This patent application is a continuation-in-part (CIP) of U.S. patent application Ser. No. 08/876,221, filed Jun. 16, 1997 and residing in Art Group 3641 now abandoned.

TECHNICAL FIELD

The subject invention relates to method and apparatus for automatically countering asymmetrical aerodynamic forces subjected on multi engine aircraft during flight. More particularly, this invention relates to sensing and signaling undesirable rotation of the aircraft about its longitudinal axis "c" and automatically controlling the aircraft in response to said signal with said automatically controlling being independent of other controlling systems and surfaces of the aircraft.

BACKGROUND ART

Under normal flying conditions of multi engine aircraft, the air streams passing over the surface of the aircraft are substantially symmetrical, the controls are in the neutral position, the engines are producing substantially equal thrust, and the fuselage of the aircraft is substantially horizontally oriented.

In response to various external and internal conditions, these air streams sometimes become asymmetrical and cause asymmetrical aerodynamic forces to be subjected on the aircraft. An example of causes for such asymmetrical forces to be subjected on the aircraft is different engine thrusts being produced.

The design of multi engine aircraft must account for the possibility of an engine failure at low speed. The unbalance of thrust from a condition of unsymmetrical power produces a yawing movement dependent upon the thrust unbalance and the lever arm of the force. The deflection of the rudder will create a side force on the tail and contribute a yawing moment to balance the yawing moment due to the unbalance of thrust. Since the yawing moment coefficient from the unbalance of thrust will be greatest at low speed, the critical requirement will be at a low speed with the one engine out and the remaining engine at maximum or near maximum power; i.e. during take off and climb conditions.

Due to the side force on the vertical tail, which increases drag, a slight bank is necessary to prevent turning flight at zero sideslip. The inoperative engine will be raised and the inclined wing lift will provide a component of force to balance the side force on the tail. In each of the critical conditions or required directional control, high directional stability is desirable as it will reduce the displacement of the aircraft from any disturbing influence. Of course, directional control must be sufficient to attain zero silidslip.

The static lateral stability of an aircraft involves consideration of rolling moments due to sideslip. The axis system of an aircraft defines a positive rolling "L" a moment about the longitudinal axis which tends to rotate the right wing down. As in other aerodynamic considerations, it is convenient to consider rolling moments in the coefficient form so that lateral stability can be evaluated independent of weight, altitude, speed, etc. The rolling moment "L" in the coefficient form is as follows:

$$L = CqSb \text{ or } C = L/qSb$$

where
- L=rolling moment, ft/lbs. positive to the right
- C=rolling moment coefficient, positive to the right
- q=dynamic pressure, psi.
- S=wing area, sq. ft.
- b=wingspan, ft.

The angle of sideslip is the angle between the airplane center line and the relative wind direction.

When the aircraft in free flight is placed in a sideslip, the lateral and directional response will be coupled; i.e. simultaneously the aircraft produces rolling moment due to sideslip and yawing moment due to sideslip. Thus, the lateral dynamic motion of the airplane in free flight must consider the coupling or interaction of the lateral and directional effects.

The principal effect to which determine the lateral dynamic characteristics of an aircraft are as follows:
1. Rolling moment due to sideslip;
2. yawing moment due to rolling velocity;
3. yawing moment due to sideslip;
4. rolling moment due to yawing velocity . . . a cross effect similar to (2) above. (If the aircraft has a yawing moment to the right, the left wing will move forward faster and momentarily develop more lift than the right and cause a rolling moment to the right.)
5. Aerodynamic side force due to sideslip;
6. rolling moment due to rolling velocity or damping in roll;
7. yawing moment due to yawing velocity or damping in yaw; and
8. the moment of inertia of the aircraft about the roll and yaw axis.

The complex interaction of these effects produce three possible types of motion of the aircraft: (a) a directional divergence; (b) a spiral divergence, and an oscillatory mode termed Dutch roll.

Directional divergence is a condition which cannot be tolerated. If the reaction to a small initial sideslip is such as to create moments which tend to increase the sideslip, directional divergence will exist. The sideslip will increase until the airplane is broadside to the wind or structural failure occurs. Spiral divergence will exist when the static directional stability is very large when compared with the dihedral effect. Dutch roll is a coupled lateral-directional oscillation which is usually dynamically stable but is objectionable because of the oscillatory nature. The damping of this oscillatory mode may be weak or strong, depending on the properties of the aircraft on a disturbance from equilibrium and is a combined rolling-yawing oscillation in which the rolling motion is phased to precede the yawing motion. Such motion is most undesirable because of the great havoc it creates in aircraft controllability.

The lateral control of an aircraft is accomplished by producing differential lift on the wings. The rolling moment created by the differential lift can be used to accelerate the airplane to some rolling motion or control the airplane in a sideslip by opposing dihedral effect. The differential lift for control in roll is usually maintained by some type of ailerons.

When an aircraft is given a rolling motion in flight, the wing tips move in a helical path through the air. The resulting angle between the flight path vector and the resulting path of the tip is the helix angle of roll.

Roll helix angle=pb/2V (radians)

Where:

p=rate of roll, radians per second b=wing span, ft.

V=aircraft velocity, ft./sec.

and one radian=57.3 degrees

Generally, the maximum values of roll helix angle obtained by control in roll are approximately 0.1 to 0.07. The helix angle of roll is actually a common denominator of roll performance.

The preceding teachings summarize the complexities at play in retaining aircraft control upon engine failure. When a multi engine aircraft, twins in particular, losses an engine during the early phases of take-off, the procedure for the pilot is to first avoid the rolling motion into the dead wing engine which could result in a spiral or inverted flight. The pilot lowers the "active" wing by applying ailerons. The "active" wing is the wing whose engine is still under power. The left and right wing ailerons are coupled and therefore two control surfaces are deployed and thereby produce double drag. As known, induced drag varies as the square of the lift, as follows:

$$D1/D2=(L2/L1)(L2/L1)$$

Where:

D1=induced drag corresponding to original lift L1

D2=induced drag corresponding to new lift L2

When the ailerons are activated, the airplane yaws toward the lowered wing thereby affecting direction stability and sideslip. To counteract this effect, the pilot applies opposite rudder to restore direction control and zero sideslip. Therefore, the rudder further increase drag.

Assuming a fast response by the pilot (3.5 seconds is required by the FAA) the airplane has now only 20% thrust available from the original 100% prior to engine shutdown. This is due to the drag of the dead engine and the control surfaces deployed to avoid loss of heading, roll-over and sideslip. Therefore the aircraft is now at the limit of its safety envelope.

By the use of the instant invention, one of (a) differential longitudinal forces delivered to the aircraft by the engines or (b) undesirable rotation of the aircraft about its longitudinal axis "c" is detected, a single control element or surface with a minimum drag or a thruster is activated which will achieve the lowering of the "active" wing, maintain directional control without the use of the rudder and retain zero sideslip.

Upon reestablishing directional control, the airplane is kept, via aerodynamic feedback loop in a control flight attitude well within its safety envelope.

When incidents occur which cause these undesirable forces, such forces must be quickly corrected or the aircraft may become uncontrollable. Various technologies have been developed to help control such problems. However, heretofore utilized technologies are often excessively and undesirably complicated, have reliability problems, are costly, not automatic nor independent of other controlling surfaces, and have an undesirably slow response time while failing to address the problem of excessive drag, thereby putting the aircraft in a marginal safety situation.

The present invention is directed to overcome one or more of the heretofore problems, as set forth above.

DISCLOSURE OF THE INVENTION

In one aspect of the invention, a method is provided for automatically countering asymmetrical aerodynamic forces subjected on a multi engine aircraft during flight. The aircraft has left and right wings, primary control elements on each wing, a fuselage, and a longitudinal fuselage axis "c". Undesirable rotation of the aircraft about axis "c" is sensed and a respective controlling signal is delivered in response thereto. The controlling signal is received and one preselected force inducing element on the aircraft is actuated and automatically causes a force exerted on the wing of the aircraft in response to the received signal. A force inducing element of this invention is positioned on each wing of the aircraft with each force inducing element being independently operational relative to primary control elements of the aircraft. The force inducing element on the aircraft is positioned in a manner and direction sufficient to substantially counteract asymmetrical forces on the aircraft.

In another aspect of this invention, apparatus is provided for automatically controlling asymmetrical aerodynamic forces subjected on a multi engine aircraft during flight. The aircraft has left and right wings and a fuselage. The fuselage has a longitudinal axis "c". A pair of force inducing elements of this invention are each positioned at a preselected position on a respective aircraft wing and are each selectively, independently actuateable in response to receiving a controlling signal. A sensing and signaling means is provided to detect direction of undesirable rotation of the aircraft relative to longitudinal axis "c" of the aircraft during flight of the aircraft. A pair of actuating elements are provided. Each of the actuating elements are connected to a respective force inducing element and to said means. Each of the actuating elements are adapted to automatically cause a force to be exerted on a preselected wing in a manner and direction sufficient to counteract the asymmetrical forces on the aircraft.

BRIEF DESCRIPTION OF THE DRAWINGS

FIG. 1 is a diagrammatic top view of a multi engine aircraft having the apparatus of this invention;

FIG. 2 is a diagrammatic frontal view of an aircraft having the apparatus of this invention, said aircraft being in level flight with symmetrical forces being subject thereupon;

FIG. 3 is a diagrammatic frontal view of an aircraft having the apparatus of this invention, said aircraft being subjected to asymmetrical aerodynamic-forces and one embodiment of the force inducing element of this invention being extended into the airstream to counteract the asymmetrical forces;

FIGS. 4(a) and 4(b) are diagrammatic frontal views of an optical tube of an inertial sensing apparatus that can be used by this invention;

FIG. 5 is a diagrammatic side view, taken along line VV of FIG. 4(b), showing a circuit of an optical sensing apparatus that can be used by this invention;

FIG. 6 is a diagrammatic top view of a primary control element having the force inducing element of this invention; and FIG. 7 is a partial diagrammatic rear view of an aircraft wing having a force inducing element of the fluid type;

BEST MODE FOR CARRYING OUT THE INVENTION

Referring to FIG. 1, a multi engine aircraft 2 has, for example, first and second engines 4,6. The aircraft 2 has left and right wings 8,10, a fuselage 12, and a fuselage longitudinal axis "c".

The left wing 8 has a force inducing element 14 of this invention and a primary control element or trim tab 16. The right wing 10 has a force inducing element 18 of this invention and a primary control element or trim tab 20. The aircraft 2 also has first and second primary control elements or elevator trim tabs 22,24 and a primary control element or rudder trim tab 26. Primary control elements are well known in the art.

By the term "primary control elements" as used herein, it is meant heretofore utilized control surfaces such as flaps, trim tabs, elevators, etc. By the term "force inducing element(s)" as used herein, it is meant the apparatus of this invention.

For purposes of brevity, the operation of the force inducing elements of this invention will be described with respect to symmetrical aerodynamic forces subjected on the aircraft in response to engine failure on the right or starboard side of the aircraft. It should be understood however, that the other force inducing element of this invention will function in a similar correcting manner when the forces are subjected on the opposed side of the aircraft. It should also be understood that the force inducing elements of this invention are selectively, independently operable relative to primary control elements of the aircraft. The force inducing elements can also be an independently operable portion of the primary control elements of the aircraft, such as the ailerons, and adapted to move with the primary control element and selectively move independently of the respective primary control element in response to a controlling signal.

At the preferred location of the force inducing elements 14,18 of this invention, said elements 14,18 are spaced outboard the primary control elements or trim tabs 16,20 adjacent the upper surface of the wing tips. By providing this preferred positioning, the moment of inertia proportional to the wing span is increased thereby providing quicker response in countering undesirable asymmetrical aerodynamic forces. It should also be understood that the force inducing elements 14,18 can be position on the lower surface of their respective wing without departing from this invention, but such placement is less desirable and actuation will be reversed relative to the teachings herein.

The engines 4,6 of this invention can be any thrust generating device, for example, jet engines and engines driving a propeller, without departing from this invention.

In the preferred embodiment of this invention, the force inducing elements 14,18 of this invention are positioned and oriented to counter asymmetrical aerodynamic forces subjected on multi engine aircraft caused by asymmetrical power delivered by the engines. In response to the aircraft encountering reduced power on one engine of the multi engine aircraft, the respective wing supporting the engine encountering reduced power will drop in elevation inducing dangerous yaw, roll and sideslip.

Referring to FIGS. 1–4, means 34 is provided for sensing one of (a) differential longitudinal forces delivered to the aircraft by the engines and (b) undesirable rotation of the aircraft relative to the longitudinal axis "c" of the aircraft 2 during flight of the aircraft 2.

FIG. 2 shows the aircraft 2 flying in a level manner with the wings 8,10 substantially parallel to the horizontal and the controls in a substantially neutral position. Such flight of the aircraft being considered as having symmetrical aerodynamic forces subjected thereupon.

FIG. 3 shows the aircraft with asymmetrical aerodynamic forces subject thereupon by reduced power on the right or starboard engine 6 which causes the right or starboard wing 10 of the aircraft 2 to lower and the aircraft to yaw and increase sideslip. Also, because the right wing lost its lift, while the left continues to experience lift, the aircraft begins to roll toward the lowered right wing. In FIG. 3, one embodiment of the force inducing apparatus of this invention is being actuated and moved into the airstream to counter the undesirable asymmetrical force.

Responsively, as later more fully described, the automatic controls of this invention cause the left or port force inducing element 14 to cause a downwardly directed force on the wing 8 by the airstream thereby countering the asymmetrical forces and rotating the aircraft about longitudinal axis "c" and urging the aircraft wing 8 to a lower level, thereby counteracting the dangerous rolling motion and maintaining the important zero slip.

Referring to FIG. 4 (a and b), the position of the inertial mass 36 of FIG. 4(a) corresponds to the orientation of the aircraft 2 of FIG. 2 and the position of the inertial mass 36 of FIG. 4(b) to the orientation of the aircraft 2 of FIG. 3. Referring to FIG. 4(b), the inertial mass 36 in tube 38, has moved to a second position in response to asymmetric forces subjected upon the aircraft 2. At this second position of the mass 36, its presence is detected and a displacement signal is delivered to the selected respective actuating element 50 (refer to FIG. 5) which is connected to respective control element 36 and to the internal sensing means 34. Receipt of the signal causes the respective force inducing element 14 to move from the first inactive position, shown in FIG. 2, to the extended active position, shown in FIG. 3.

At the extended active position, the force inducing element 14 is in the airstream passing along the surface of the aircraft 2 and thereby exerts a counteracting force on the aircraft which urges the aircraft back to a symmetrical flight path, which is spoken of by those skilled in the art as "zero slip"; i.e, symmetrical forces subjected on the aircraft surfaces. Continuous control is maintained by force inducing element 14 to assure symmetrical force positioning of the inertial mass 36. The system is now in a servo dynamic close loop.

Referring to FIGS. 4(a and b), the internal sensing means 34 is preferably a mass 36, such as for example a steel ball approximately 3 or 4 mm in diameter immersed in silicon fluid which is contained within curved glass or quartz tube 38.

The tube 38 preferably has stops 42,44 on opposed sides of the neutral location 46. The stops 42,44 assure that the mass 36 will be adjacent the inertial mass detector 48, 48' in response to the aircraft 2 rotating a preselected number of degrees. It will be readily understood that the tube 38 will be longitudinally oriented substantially normal to the axis "c" about which undesirable rotation is to be countered. It will be understood that where rotation about more than one axis is desired to be countered, there may be a separate set of means 34 having a mass, a tube, and being connected to associated actuating means and control elements.

Referring to FIG. 4(b), it will be understood by one skilled in the art that movement of the mass 36 to the position shown will generate one signal and movement of the mass 36 to stop 44 will generate a different signal thereby causing the actuation the other force inducing element associated with the respective position of the mass 36. As shown in FIG. 3, movement of the mass 36 to the stop 42 actuates force inducing element 14 and movement of the mass 36 to the stop 44 would actuate force inducing element 18. It is preferred that tube 38 contain a viscous fluid, such as for example silicon.

The force inducing elements 14,18 of this invention can be of the linearly extending type, the pivotal type, or thrust vectoring outlets controlled by engine gases or in situ compressed gas reservoirs electrically controlled (fly by wire). Preferably they are of the pivotal type. If of the thrust type, it is preferred that the force generating fluid be compressed gas.

Referring to FIG. 5, mass 36 is detected in tube 38 by the optical inertial mass position detector system 52 which delivers an actuating signal to actuator 50, which responsively causes its respective control element 14 to extend into the airstream. Element 51 is a power transistor and elements 60 and 61 are biasing resistors, as are well known in the art. Actuator 50 can be a hydraulic or electro-mechanical actuator, preferably an electro-mechanical actuator.

The controlling signal delivered to the force inducing elements 14,18 can also be directly responsive to physical operating conditions of the engines, for example, manifold pressure, RPM, etc.

Referring to FIG. 6, the force inducing element 14' is of different construction and is a portion of a primary control element of that wing 8, such as modified aileron 80. As shown, the force inducing element 14' is of the pivotally moveable type with a gradual increased camber toward the wing tip.

Referring to FIG. 7, a force inducing element 14" of yet a different construction is shown. In this embodiment, the force inducing element 14" is a gas thrust vectoring system that is adapted to receive pressurized fluid from a pressurized source such as an independent pressurized source or an engine exhaust 81. The orientation of the exhaust gases is such as to produce vectoring forces to lower the wing and maintain aircraft heading. The vectoring thrust is preferably controlled via the dynamic servo loop with an electronic valve.

INDUSTRIAL APPLICABILITY

In the operation of a aircraft having the apparatus of this invention, force inducing elements 14,18 of this invention, will be actuated in response to detection of one of (a) differential longitudinal forces induced on the aircraft by the engines or (b) undesirable rotation of the aircraft about axis "c".

The force subjected on the aircraft by the force inducing element 14/18 will counter asymmetrical forces. The controlling elements 14,18 of this invention function selectively and independently of other controlling surfaces of the aircraft. In one embodiment of the invention, the force inducing elements can each be a portion of the primary control elements of the aircraft and move with the respective primary control element in the absence of said controlling signal and move independently relative to the respective primary control element in response to the presence of said controlling signal.

It should be understood that the inertial mass and its associated detecting apparatus is preferably positioned as part of the aircraft instrument panel, but can, without departing from this invention, be positioned elsewhere. The system of this invention can also be associated with audio and/or visual signaling devices which indicate the presence of asymmetrical conditions and alert the pilot to the malfunction.

In flight testing of the invention, it was demonstrated that, within certain flight envelopes, no pilot input was required to maintain aircraft control. This demonstrated fact suggests that the invention is suitable for unmanned airborne vehicles.

Other aspects, objections and advantages will be apparent from a study of the application, drawings, and appended claims.

What is claimed is:

1. A method for automatically, free of pilot input, countering undesirable changing attitude of a multi-engine aircraft caused by asymmetrical aerodynamic forces subjected on the aircraft during flight, said aircraft having left and right wings, a primary control element on each wing, a fuselage, and a longitudinal fuselage axis "c", comprising:

sensing undesirable rotation of the aircraft about axis "c" and delivering a respective controlling signal in response thereto;

receiving the controlling signal; and automatically, free of pilot input, causing a force to be exerted on a preselected wing, in response to receiving the controlling signal, in a manner and direction sufficient to counteract the asymmetrical forces on the aircraft and undesirable yaw and roll of the aircraft, said aircraft having a force inducing element on each wing with said force inducing elements being selectively, independently operational relative to primary control elements of the aircraft, said force inducing elements are each a portion of a respective primary control element of a respective wing and each having an increase chamber toward the respective wing tip and being independently actuatable.

2. A method, as set forth in claim 1, wherein the direction of the undesirable rotation of the aircraft is one of a negative and positive degree of rotation about the axis "c" from a preselected attitude of the aircraft at which the wings are substantially horizontally positioned.

3. A method, as set forth in claim 1, wherein the force inducing elements are each pivotally moveable surface portions of a respective aircraft wing.

4. A method, as set forth in claim 1, wherein the force inducing elements are each linearly moveable surface portions of a respective aircraft wing.

5. A method, as set forth in claim 1, wherein the force inducing elements are each wing tip positioned thrust vectoring systems for selectively discharging pressurized fluid in a preselected direction and maintaining zero sideslip flight conditions in response to receiving said controlling signal.

6. An apparatus for automatically, free of pilot input, controlling undesirable changing attitude of a multi engine aircraft caused by asymmetrical aerodynamic forces subjected on the aircraft during flight, said aircraft having left and right wings each having primary control elements, and a fuselage having a longitudinal axis "c", comprising:

a pair of force inducing elements each positioned at a preselected location on a respective aircraft wing and each being selectively, independently actuatable in response to receiving a controlling signal;

means for sensing the direction of undesirable rotation of the aircraft relative to axis "c" of the aircraft during flight of the aircraft and delivering a controlling signal in response there; and a pair of actuating elements, each actuating element being connected to a respective force inducing element and to said sensing means and being adapted to automatically and free of pilot input cause a force to be exerted on a preselected wing in a manner and direction sufficient to counteract the asymmetrical forces on the aircraft and undesirable yaw and roll of the aircraft in response to receiving said controlling signal, said force inducing elements are each a portion of a respective primary control element of a respective wing and having an increasing camber toward their respective wing tip and each being independently moveable in response to receiving said controlling signal.

7. An apparatus, as set forth in claim 6, wherein said force elements are each positioned at a substantially identical relative location on a respective wing of the aircraft.

8. An apparatus, as set forth in claim 6, wherein each force inducting element is positioned adjacent a respective wing tip.

9. An apparatus, as set forth in claim 6, wherein each force inducing element is a pivotally moveable surface portion of a respective aircraft wing.

10. An apparatus, as set forth in claim 9, wherein the force inducing element is pivotally connected along an axis angularly oriented relative to an axis normal to axis "c".

11. An apparatus, as set forth in claim 10, wherein each force inducting element is pivotally connected to a respective aircraft wing along an axis angularly oriented less than 90 degrees relative to axis "c".

12. An apparatus, as set forth in claim 6, wherein the force inducing elements are each linearly moveable surface portions of a respective aircraft wing.

13. An apparatus, as set forth in claim 6, wherein the force inducing elements are each wing tip positioned thrust vectoring systems adapted to selectively discharge pressurized fluid in a preselected direction in response to receiving said controlling signal.

14. An apparatus, as set forth in claim 13, wherein the pressurized fluid of the vectoring system is exhaust gasses discharging from an engine of the aircraft.

15. An apparatus, as set forth in claim 13, wherein the pressurized fluid of the vectoring system is exhaust gasses discharging from a self contained pressurized source.

16. An apparatus, as set forth in claim 13, wherein controls of discharge of the gases include an electric control valve functioning in response to pulse width modulation.

* * * * *